United States Patent Office 3,464,022
Patented Aug. 26, 1969

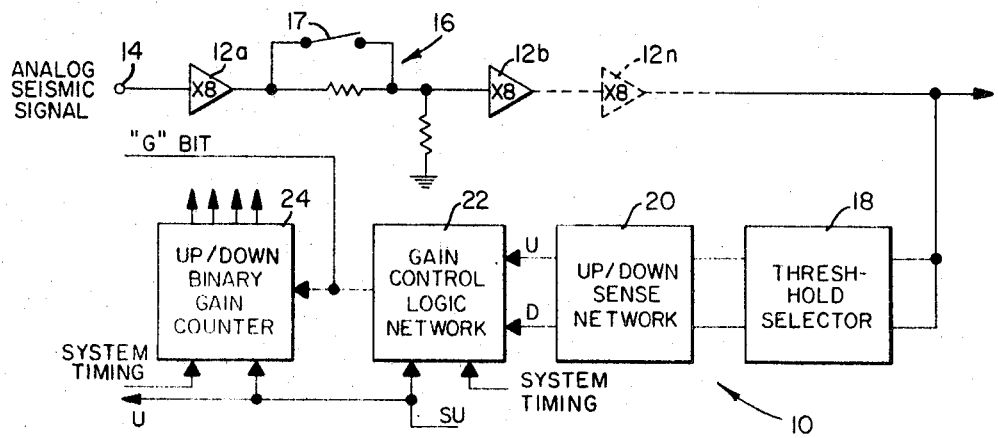
FIG_1
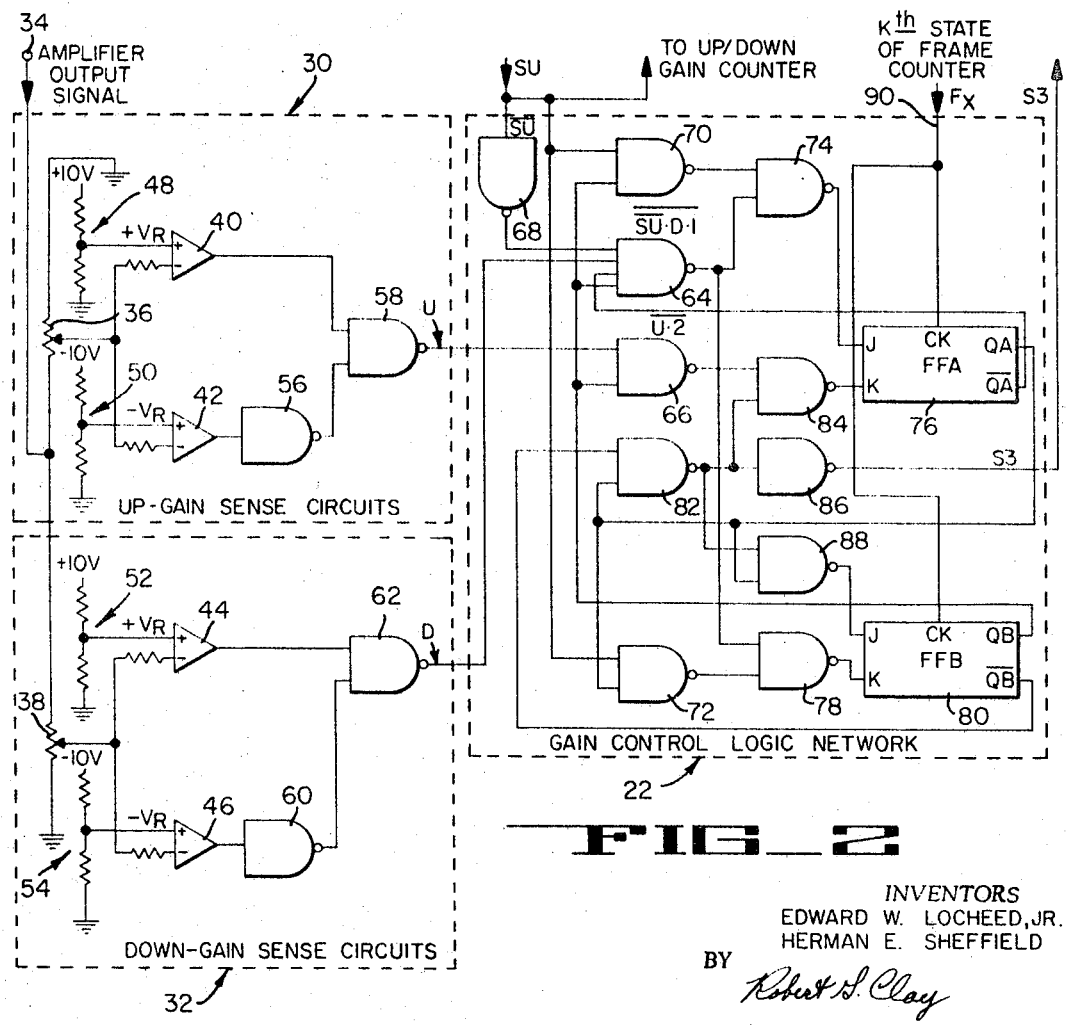
FIG_2
INVENTORS
EDWARD W. LOCHEED, JR.
HERMAN E. SHEFFIELD
BY Robert S. Clay
ATTORNEY

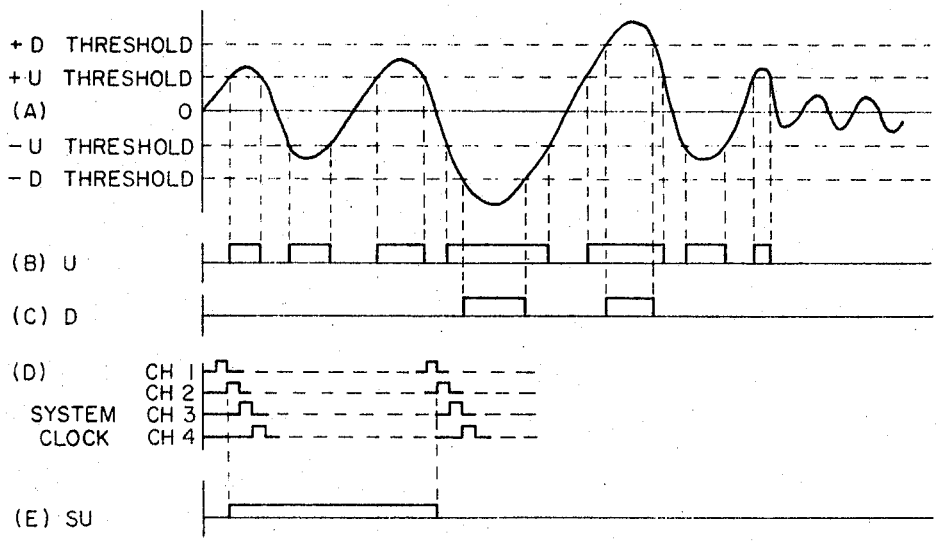
FIG_4
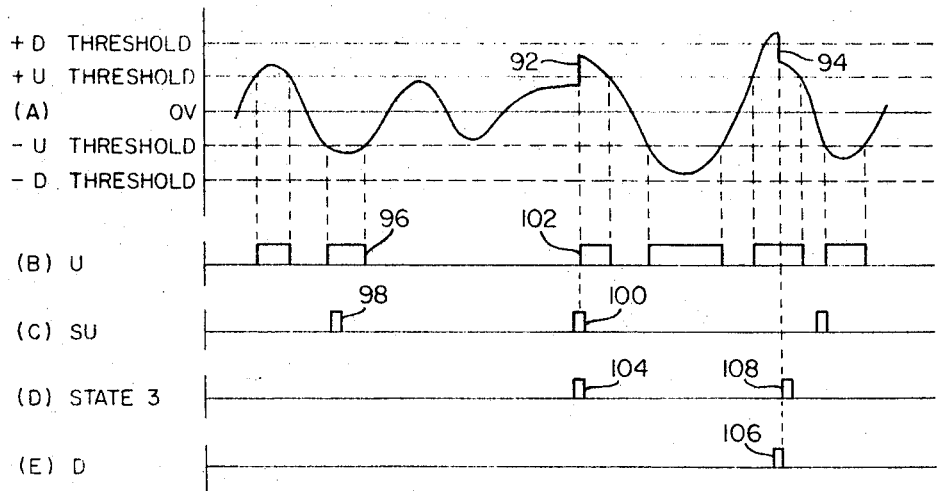
FIG_5
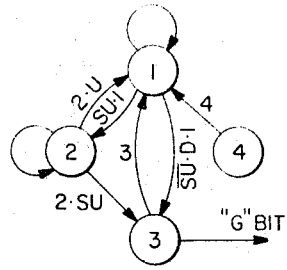
FIG_3

3,464,022
APPARATUS FOR CONTROLLING THE GAIN OF BINARY GAIN RANGING AMPLIFIERS
Edward W. Locheed, Jr., and Herman E. Sheffield, Houston, Tex., assignors to Mandrel Industries, Inc., Houston, Tex., a corporation of Michigan
Filed Aug. 30, 1967, Ser. No. 664,453
Int. Cl. H03f 1/30
U.S. Cl. 330—144                                                    3 Claims

ABSTRACT OF THE DISCLOSURE

Method and apparatus for effective bi-directional control of gain ranging amplifiers wherein a portion of the analog signal from the amplifiers is fed back through a signal level sensing means, is compared to selected high and low signal thresholds and converted to digital signals indicative of the analog signal level, and is then introduced to a gain control logic means which produces the required change in gain in synchronism with the overall system operation.

Background of the invention

In seismic exploration systems, seismic waves are transmitted into the earth and are detected at successive points spaced from the point of transmission by means of seismic geophones. The signals produced by the geophones are relatively strong with respect to the first arrivals of the reflected waves, but the successive, later arrivals, are progressively weaker in strength. Thus, the seismic signal introduced to the recording equipment may vary, for example, from a volt to the order of microvolts. Since it is desirable to maintain the output of the amplifiers within a constant range, the gain of the respective amplifier is varied to compensate for the inherent decrease of seismic signal with time.

Various prior art systems are presently employed to compensate for the decrease of signal strength. Typical among these are the AVC (automatic volume control) systems which employ an amplifier connected to the geophone, and an attenuator connected to the amplifier to attenuate the stronger first signal arrivals and to gradually decrease the attenuation during receipt of subsequent arrivals, to provide a constant gain over the entire period of the seismic record. Other, more sophisticated prior art systems employ means coupled to a plurality of amplifiers to increase the gain in fixed steps with a constant factor of amplification. The analog signal is converted to digital outputs and is recorded by digital recording equipment along with the valve of the amplification gain introduced to the amplifiers. One prior art system is shown in U.S. Patent No. 3,308,392 filed Feb. 4, 1965, issued to E. R. McCarter.

Such prior art systems either fail to provide means for recording the value of the gain changes made, or fail to provide the changes with synchronous timing or with means for variably controlling the occurrence of the gain changes. In addition prior systems utilize level sensing networks which are inherently inaccurate since they require precise analog inversion and trip-level of for example Schmitt triggers, which act on the incoming analog signal in order to preserve symmetrical sensing about the zero signal axis. Even the more sophisticated prior art systems fail to provide synchronous timing of the gain changes to allow maximum settling of the signal before the next sample is taken, nor can they provide the changes at a selected, variable time after the decision to change the gain is made. In addition, prior art circuits do not operate symmetrically on the positive and negative excursions of the incoming analog signal. Prior art systems generally provide means for increasing the gain only, and thus provide uni-directional, not bi-directional gain ranging. In addition, the more sophisticated prior art gain ranging systems are relatively complex in design, large in size, and are difficult to control, thereby providing operation with questionable dependability.

Summary of the invention

The present invention provides a method and relatively simple apparatus for bi-directional control of the gain of an amplifier, wherein the increases or decreases in gain are made in selected synchronism with the overall seismic recording equipment operation, with maximum repeatability, controllability, and dependability. The invention includes means for extracting a portion of the incoming analog signal and for comparing the signal to selected thresholds, means for providing a digital output which is indicative of the value of the analog signal with respect to the selected thresholds and thus which indicates the need to maintain, decrease or increase the amplifier gain during the time of arrival of the analog signal, and means for performing the required changes in gain in variable and controllable synchronization with the overall recording equipment.

Thus the invention includes a threshold selector for providing an upper and a lower threshold, which introduces the portion of the analog signal to an up/down sense network. The network delivers at random an up-gain or a down-gain sense signal, in digital form, which is dependent on the level of the analog signal with respect to the fixed thresholds. The up-gain or down-gain sense signal is introduced to a gain control logic network which delivers a command to the amplifier to raise or lower the gain thereof, in response to the incoming sense signal and to synchronizing signals introduced to the logic network from the overall recording equipment. When a gain change has been made, means is provided to "remember" this change until an indicator bit may be written in the proper position of the digital tape format.

Accordingly, the invention overcomes the shortcomings of the prior art amplifier gain ranging devices by providing, for example, bi-directional gain ranging in response to synchronizing pulses from the recording equipment.

Brief description of the drawings

FIGURE 1 is a simplified schematic diagram in block form, depicting one embodiment of apparatus for performing the invention concepts.

FIGURE 2 is a schematic diagram showing in greater detail, the exemplary circuit of FIGURE 1.

FIGURE 3 is a state diagram depicting the various states of operation for each channel of the invention apparatus.

FIGURES 4 and 5 are waveform charts illustrating various waveforms generated at different points in the circuit of FIGURE 2 at various times of operation.

Description of the preferred embodiments

Referring to FIGURE 1, there is shown by way of example only, a preferred gain ranging system 10 in accordance with the invention, as utilized in conjunction with digital seismic recording equipment, a portion of which is shown in FIGURE 1. A plurality of cascaded amplifier stages $12a$, $12b$, ... $12n$ are shown coupled to an input 14 which constitutes an incoming, analog seismic signal which is generated by a conventional seismic receiver (not shown). An attenuating network 16 is disposed in the line of amplifiers $12a$–$12n$, and serves to provide precise incremental loss or gain in ratios of $2^{-n}$ by switching the parallel relay contacts 17 either open or closed respectively. Although the invention is described in conjunction with a series of seismic amplifiers, it may be utilized to vary the gain of any amplifier which is operating on an analog signal.

In accordance with the invention, a threshold selector circuit 18 is connected to the output of the amplifiers 12a–12n, and serves to extract a portion of the analog seismic signal provided by the amplifiers, into the gain ranging system 10. The threshold selector circuit 18 provides means for extracting a portion of analog signal to be compared to fixed thresholds, whereby the analog seismic signal may be compared to determine if the signal is within the desired level, or if it is too large, or too small. An up/down sense network 20 is coupled to the threshold selector circuit 18 via a pair of lines, wherein a comparison is made between the extracted portion of the seismic signal and a pair of positive and negative, upper and lower thresholds, further described below. The result of the comparison is encoded by the up/down sense network 20 into two lines to provide digital output signals, which are identified herein as an "up" (U) and a "down" (D) signal. The U and D signals are indicative of the analog signal level, that is, whether the analog signal is within the range between the lower and upper thresholds, or whether the analog signal is too large (over the upper threshold) or too small (under the lower threshold). Thus U is present whenever the analog signal exceeds the lower (up-sense) threshold, and D is present whenever the analog signal exceeds the upper (down-sense) threshold. U is not present only when the analog signal is less than the lower threshold.

A gain control logic network 22 is coupled to the up/down sense network 20 via the two lines, and receives the digital signals U or D from the network 20. In addition, the logic network 22 is coupled to an external clock circuit (not shown) which is the overall recording system clock or system timing, and also to a source (not shown) of timing pulses herein designated as SU. SU is defined as one or more states of the scan counter which counts cycles of the digital system frame counter (not shown) in the digital recording system, during which states increases of gain will be allowed. The frame counter is that counter in the digital system which keeps track of the physical location of recorded data on the recording tape. Thus, SU might be true, for example, for one scan of each 15, for one scan of each 30, or for other selected numbers of scans.

Accordingly, the gain control logic network 22 combines the inputs U, D, SU and the clock pulses, and determines when the gain of each amplifier channel is to be corrected, according to the system timing. Thus, the gain ranging system 10 of the invention provides means for varying the gain of the amplifiers wherein the correction is made synchronously with the external timing system and with some known minimum time delay before change. An up/down binary gain counter 24 is coupled to the logic network 22 output and also to SU, and in turn is coupled to the attenuators in each channel via respective gates and control relays (not shown), to control the gain of the amplifiers in accordance with the information supplied by the logic network 22 and SU. Thus, the counter 24 receives a steering signal in the form of SU, which tells the counter whether to count up or down. Counter 24 will count up if it receives a clock input when SU is true, and will count down if it receives a clock input when SU is false. The counter 24 is told when to count by sensing the positive leading edge of the clock pulse. Various DC inputs (not shown) are provided to the counter 24 which allow it to be preset to any initial conditions. A "G" bit output is provided to the tape format to record the fact that a gain change has occurred.

Referring to FIGURE 2, by way of example only, there is shown one circuit which may be utilized to define the gain ranging system 10 of the invention. The threshold selector 18 and up/down sense network 20 of FIGURE 1 are herein shown as an up-gain sense circuit and a down-gain sense circuit 30 and 32 respectively. The output of the amplifiers 12a–12n, indicated at 34, is introduced to a pair of adjustable potentiometers 36, 38 which form a part of the up-gain and down-gain sense circuits 30 and 32 respectively as shown in FIGURE 2. The lower and upper thresholds of previous mention are selected by adjusting the potentiometers 36 and 38 respectively. The adjustable contacts of the potentiometers 36 and 38 are connected to respective pairs of differential comparators 40, 42, and 44, 46 within the up-gain and down-gain sense circuits 30, 32 respectively. A second input is provided to each differential comparator 40–46 and is connected to an associated source 48–54 of selected voltage level, to provide a reference voltage for determining the upper and lower thresholds. Comparators 40 and 42 thus are provided with equal magnitude, positive and negative, reference voltages fed thereto from the sources 48, 50. The comparator 42 is connected via a Nand gate 56 to another Nand gate 58, and comparator 40 is connected as the second input to the Nand gate 58. Nand gate 56 provides digital inversion to effect an absolute magnitude comparison of the analog signal at all times. The output U is provided by the up-gain sense circuit 30 via the Nand gate 58.

The down-gain sense circuit is similar in configuration and provides a Nand gate 60 connected at its input to the comparator 46, and at its output to a Nand gate 62. The comparator 44 is connected as a second input to the Nand gate 62, which provides the output D from the down-gain sense circuit 32. The comparators 44, 46 are supplied with equal magnitude, positive and negative, reference voltages from the sources 52, 54 which voltages are however of different magnitude of those fed to comparators 40, 42. Nand gate 60 provides digital inversion in the manner of Nand gate 56.

The outputs D and U are coupled via respective lines to the gain control logic network 22, which comprises essentially a cascaded series of Nand gates and a pair of flip-flop circuits; and thus a sequential switching network. More particularly, output D is introduced to a Nand gate 64, and output U is introduced to a Nand gate 66. SU is introduced as another input to the Nand gate 64 via a Nand gate 68, and is also introduced to Nand gates 70 and 72. Nand gates 70 and 64 are connected to a Nand gate 74, which in turn is connected to a first flip-flop circuit 76. The outputs of Nand gates 64 and 72 are introduced to a Nand gate 78, which in turn is connected at its output to a second flip-flop circuit 80. The output of a Nand gate 82 is connected to Nand gates 84, 86 and 88, and Nand gate 66 provides a second input to Nand gate 84. Nand gate 86 provides an output S3 which is fed to the gain counter 24. System timing, e.g., a system clock input 90 is provided to the flip-flop circuits 76 and 80.

The flip-flops 76 and 80 provide output $Q_A$, $\overline{Q_A}$, and $Q_B$, $\overline{Q_B}$ respectively. $Q_B$ is provided as an input to Nand gates 70, 64 and 66; $\overline{Q_B}$ is provided as an input to Nand gate 82; $Q_A$ is provided to Nand gates 82, 88 and 72; and $\overline{Q_A}$ is provided to Nand gate 64. Nand gates 64 and 66 provide outputs $\overline{SU.D.1}$ and $\overline{U.2}$ respectively.

As may be seen, the present invention senses the level of the analog signal and compares same with a selectable, fixed threshold, which concept is applied in the more sophisticated prior art systems, wherein however it is necessary in the prior art system to invert the negative excursions of the analog signal before sensing the value. The invention on the other hand, unlike prior art systems, does not invert the negative excursions but sets both a positive and a negative threshold and then superimposes the random analog signal and senses both positive and negative excursions of the signal. Furthermore, the invention provides a digital output for the outputs U and D, which define therefore, simply a "go" or "no go" type of information. U and D are supplied at random with respect to the overall recording system timing, and are operated on by the gain control logic network 22 to provide gain correction which is synchronized with respect to the overall system timing.

The operation of the up-gain sense circuit 30 and of the down-gain sense circuit 32 is the same, except that a higher fixed voltage is applied to the reference inputs (the positive inputs) of the down-gain comparators 44 and 46, because these references must always be higher in magnitude than the up-gain sense circuit references.

Regarding by way of example only the specific operation of the up-gain sense circuit 30, the reference input of the comparator 40 is set at, for example, +0.5 volt and that of the comparator 42 is set at −0.5 volt. The output U is thus generated whenever the voltage at the movable contact of potentiometer 36 is higher than +0.5 volt or lower than −0.5 volt. By adjusting the potentiometer 36, U may be generated when the amplifier output exceeds any desired voltage higher than ±0.5 volt.

The gain control logic network 22 generates an S3 pulse (state 3 of the network FIGURE 3) whose leading edge clocks the amplifier gain counter 24 (FIGURES 4 and 5) and which is also used by the system formating logic (not shown) to remember that a gain change has occurred. The gain control logic network 22 is clocked by an appropriate state of the overall recording system frame counter of previous mention. A state is preferably selected which follows closely after the amplifier gain which has been recorded, so that the amplifier gain introduced by the logic network 22 changes shortly after gain recording and the amplifier has maximum settling time before gain is recorded again in a following comparison. S3 will then stay true for a full scan since the control logic network clock will occur once during each scan. S3 is thus a memory for the formating logic and notes that a gain change has occurred.

The requirements for a gain change are such that a downward gain change should occur as often as possible to reduce the gain as quickly as possible to prevent overloading the amplifier. Thus the gain control logic network 22 provides that S3 will be generated the first $F_x$ when D is true and every other scan thereafter if D again is true. $F_x$ is one state of the digital system frame counter.

On the other hand, an upward gain change should occur when U has not occurred for some preset period, and also when a preset period has elapsed since the last upward gain change and U has not occurred. Thus when the analog signal is low, enough time has to pass to insure that the signal is, in fact, below the lower threshold and not simply crossing the threshold during the central portion of the analog signal excursion. Thus, the invention provides not only control of this time interval, but also allows adjusting the period of time delayed.

The gain control logic network 22 goes into state 2 (FIGURE 3) for each SU pulse. If a U has not occurred when SU goes true again, the logic network 22 will go to state 3 and an upward gain change will be initiated since SU will be true and will enable the amplifier gain counter 24 to count up. If U stays false, upward gain changes will continue to be generated upon every other SU occurrence. The rate of SU thus determines the release rate of the amplifier. The release rate may be adjusted by selecting the number of scans between the occurrence of successive SU pulses. State 4 provides an "automatic start" state, wherein the network 22 automatically goes into state 1 when it starts in state 4.

Regarding by way of example only the various states which may exist in each of the channels, as shown in FIGURE 3, assume state 1 as some initial state. If the system is set for 30 scans (as previously mentioned by way of example), SU appears every thirtieth clock pulse for a preselected channel (FIGURE 4D and E). If the system is in state 1 and SU appears, a shift is made to state 2 independent of the signals D and/or U. When in state 2 the system may shift to either state 1 or state 3. If U is received in the logic network 22 with a channel clock, the system shifts to state 1 which is in conformance with the up threshold condition. On the other hand, if the system stays in state 2 until the next SU appears, the time interval would indicate the need to increase the gain. The system shifts to state 3 which indicates the need for a gain change, based on the SU level. An output is created which directs the gain counter 24 to count again, and to record the fact that a change was made. If the system is in state 3, it will shift to state 1. If in state 1 and a D signal is received, with SU not present, the system shifts to state 3 and the gain is decreased.

Thus it may be seen that the system is never more than two clock pulses away from a decrease in gain, and 60 clock pulses away from an increase in gain (in this particular example).

Accordingly, as seen in FIGURE 4, the analog signal waveform of FIGURE 4A is introduced in the form of a variable magnitude as selected by the potentiometers 36, 38 of the up-gain and down-gain sense circuits 30, 32. The variable magnitude is acted upon by the up/down sense network 20 to generate the U signal, FIGURE 4B, and the D signal, FIGURE 4C. U and D are then introduced to the gain control logic network 22 where they are acted upon by the signals represented, for example, in FIGURE 4D and 4E. As may be seen, if U fails to appear a gain increase results, and if D appears a gain decrease results.

Referring to FIGURE 4D and E, every channel has one clock pulse which falls within (or occurs during) the presence of the SU signal. The gain control logic for a particular channel 3 of the gain control logic network 22, uses the channel 4 system clock. That is, a channel clock is supplied to each channel, which regulates the sampling process thereof, wherein accordingly each channel is treated separately and in sequence. Given channel $n$, at channel $n$ clock time the system samples channel $n$ gain, and at channel $n+1$ time it samples $n+1$ gain but changes at this time the gain for channel $n$, if a gain change is required. This combination is given by way of example only, since it could be modified, although the concept of a particular channel clock for a given channel of the gain control logic network 22 will remain true.

FIGURE 5 shows by way of example, a typical waveform set for the case of a decreasing and an increasing analog signal, shown at points 92 and 94 respectively of FIGURE 5A. The decreasing and increasing signals at points 92 and 94 require an increase and a decrease of the gain, respectively. The effects of the changes are shown in FIGURE 5A.

It may be seen in FIGURE 5A and B, that the analog signal falls below the U threshold causing U signal 96 to become false prior to the occurrence of SU signal 98. Subsequently SU signal 98 and 100 occur and during SU signal 100 an up change is initiated causing the analog signal to once again exceed the U threshold, generating a U signal 102. The change is actuated by the state 3 pulse 104 in FIGURE 5D.

Just prior to the time indicated by point 94 in FIGURE 5A, the analog signal exceeds the D threshold, at which time the D signal 106 of FIGURE 5E is generated. On the next channel clock during which SU is false, state 3 pulse 108 is generated thus decreasing the gain at point 94 and simultaneously terminating D.

Although the invention has been described herein with respect to a single embodiment various modifications may be made thereto within the spirit of the invention, and thus it is not intended to limit the scope of the invention.

What is claimed is:

1. A gain ranging system for bi-directional control of a gain ranging amplifier commensurate with the positive or negative level of an analog signal, wherein the analog signal is scanned at selected intervals, comprising;

threshold selecting means coupled to the output of the amplifier for extracting a portion of the analog signal therefrom and for determining pairs of positive and negative upper and lower thresholds;

up/down sense network means coupled to the threshold selecting means for comparing the positive or negative level of the extracted analog signal to the pairs of positive and negative upper and lower thresholds and for delivering a gain-changing command in the form of an asynchronous digital output;

said up/down sense network including an up-gain sense circuit for delivering an "up" gain signal whenever the analog signal level exceeds one of the pair of thresholds, and further includes a down-gain sense circuit for delivering a "down" gain signal whenever the analog signal level exceeds the other one of the pair of thresholds, said "up" and "down" signals defining said asynchronous digital output;

gain control logic network means coupled to said up-gain and down-gain sense circuits and to said amplifier for synchronously controlling the change of gain of the amplifier in response to said asynchronous digital output and for remembering gain change information for formating purposes;

an up/down binary gain counter coupled to said gain control logic network means to receive therefrom the gain-changing command in the form of the "up" and "down" gain signals, said counter being operatively coupled to the amplifier to selectively institute therein a change of gain in response to the "up" and "down" gain signals;

a source of clock pulses coupled to said gain control logic network means; and a second source of timing pulses coupled to the gain control logic network means and to the up/down binary gain counter, said sources providing selected synchronization of the logic network means and counter outputs.

2. The gain ranging system of claim 1 wherein said up/down binary gain counter provides an increase in gain during a selected scan interval upon receiving a clock pulse and a timing pulse from said first and second sources, respectively, and provides a decrease in gain during any scan interval upon receiving a clock pulse without receiving a timing pulse from said second source.

3. The gain ranging system of claim 2 wherein said up-gain and down-gain sense circuits each include a pair of differential comparators each pair connected to said threshold selecting means for sensing the positive or negative level of a respective one of the pair of thresholds, a positive and a negative reference voltage source coupled to each of the pairs of differential comparators to sense both the positive and negative excursions of the analog signal, and digital circuit means coupled to said pairs of differential comparators to provide said "up" gain and "down" gain signals in response to the positive and negative levels sensed by the comparators.

References Cited

UNITED STATES PATENTS

| | | | |
|---|---|---|---|
| 3,308,392 | 3/1967 | McCarter | 330—144 |
| 3,376,557 | 4/1968 | Godinez | 340—15.5 X |
| 3,392,370 | 7/1968 | Neitzel | 340—15.5 |

ROY LAKE, Primary Examiner

J. B. MULLINS, Assistant Examiner

U.S. Cl. X.R.

340—15.5